(12) United States Patent
Yoshimura et al.

(10) Patent No.: US 7,099,560 B2
(45) Date of Patent: Aug. 29, 2006

(54) INFORMATION RECORDING APPARATUS, INFORMATION RECORDING METHOD, AND INFORMATION RECORDING MEDIUM IN WHICH INFORMATION RECORDING PROGRAM IS COMPUTER-READABLY RECORDED

(75) Inventors: Ryuichiro Yoshimura, Tokorozawa (JP); Masami Oishi, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 1155 days.

(21) Appl. No.: 09/968,502

(22) Filed: Oct. 2, 2001

(65) Prior Publication Data

US 2002/0039482 A1    Apr. 4, 2002

(30) Foreign Application Priority Data

Oct. 3, 2000    (JP) .......................... P2000-303626

(51) Int. Cl.
*H04N 5/91* (2006.01)
(52) U.S. Cl. .................. 386/94; 386/125; 386/127
(58) Field of Classification Search ............... 386/1, 386/45, 33, 94–95, 125–126; 360/60; 380/201, 380/203
See application file for complete search history.

(56) References Cited

U.S. PATENT DOCUMENTS 5,729,516 A * 3/1998 Tozaki et al. ............ 369/53.21

FOREIGN PATENT DOCUMENTS

| EP | 0 930 616 A2 A3 | 7/1999 |
| EP | 0930616 A2 * | 7/1999 |
| EP | 1 067 544 A1 | 1/2001 |
| GB | 2 330 031 A * | 4/1999 |

OTHER PUBLICATIONS

"Illustrated Latest MPEG Textbook" ASCII Corporation, pp. 154-165, 1994.

* cited by examiner

*Primary Examiner*—Thai Tran
*Assistant Examiner*—Helen Shibru
(74) *Attorney, Agent, or Firm*—Drinker Biddle & Reath LLP

(57) ABSTRACT

According to the present invention, there is provided an information recording apparatus in which, even when the apparatus is an information recording apparatus which cannot previously determine that a recording signal with any attribute is inputted, a recording signal conformable to DVD video standards which is recorded in an available optical disc can be prevented from being illegally copied. The information recording apparatus includes a CPU for detecting whether a recording signal to be inputted from the outside is a specific recording signal having characteristics as a recording signal recorded in an available optical disc and, when it is detected that the recording signal is the specific recording signal, inhibiting the recording signal from being recorded in an optical disc.

9 Claims, 6 Drawing Sheets

INFORMATION RECORDING APPARATUS, INFORMATION RECORDING METHOD, AND INFORMATION RECORDING MEDIUM IN WHICH INFORMATION RECORDING PROGRAM IS COMPUTER-READABLY RECORDED

BACKGROUND OF THE INVENTION (i) Field of the Invention

The present invention relates to a technical field regarding an information recording apparatus, an information recording method, and an information recording medium in which a program for recording information is recorded so as to be readable through a computer. More particularly, the present invention relates to a technical field regarding an information recording apparatus in a personal computer, which is used as a data recorder for the personal computer, an information recording method, and an information recording medium in which an information recording program for the information recording is recorded so as to be readable through a computer including the personal computer.

(ii) Description of the Related Art

In recent years, in a field regarding an optical disc such as a DVD (Digital Versatile Disc), the trend toward higher recording density is pronounced. Lately, an optical disc in which image information and speech information as much as one movie are recorded is being commercially available. A data recorder for the optical disc can also be provided for a personal computer.

The foregoing movie is generally protected by copyright. Copying the movie without asking a copyright holder for permission is prohibited in principle with some exceptions. Accordingly, to prevent the illegal copy, a general video recorder, which originally intends to record the movie in the optical disc, is constructed so that, for example, the presence or absence of recording inhibition information embedded in recording signals corresponding to the movie according to a so-called electronic watermark technique may be detected to prevent the illegal copy.

On the other hand, the data recorder is different from the general video recorder. The data recorder cannot previously determine that any kind of data is inputted to the recorder and is then recorded. Consequently, it is general that the data recorder does not include a configuration for preventing the above-mentioned illegal copy.

On the other hand, recently, recording signals corresponding to the movie can be copied through the personal computer. Accordingly, in the foregoing data recorder, it is also necessary to have the configuration for preventing the illegal copy.

In the illegal copy preventing method by using the above-mentioned electronic watermark technique, however, upon recording in the optical disc, it is necessary to analyze the content of the inputted recording signal in detail and detect the presence or absence of the recording inhibition information. When the data recorder includes the configuration for the above purpose, the circuit scale of the data recorder is exaggeratedly increased.

In many cases, the recording signals of the movie are formed in conformity with so-called DVD video standards. According to the DVD video standards, the recording signals are subjected to a compression processing according to a system such as MPEG-2 (Moving Picture Experts Group 2) system. Accordingly, the analyzing processing becomes more complicated, so that a circuit for analysis with a large scale is further needed.

Furthermore, in addition to the above circuit for analysis, a circuit for detecting the recording inhibition information from the analyzed recording signal is also needed. The circuit scale of the data recorder becomes larger as a whole.

As for the above-mentioned data recorder for the personal computer, it is necessary to store the recorder into the housing of the personal computer. For this reason, the miniaturization of the data recorder is desired. When the circuit scale is exaggeratedly increased as mentioned above, the miniaturization cannot be realized.

SUMMARY OF THE INVENTION

Accordingly, the present invention is made in consideration of the above-mentioned problems. It is an object of the present invention to provide an information recording apparatus in which, even when the apparatus is an information recording apparatus which cannot previously determine that a recording signal with any attribute is inputted, a recording signal conformable to DVD video standards which is recorded in a commercially available optical disc can be prevented from being illegally copied with a simple and low-cost configuration, an information recording method, and an information recording medium in which an information recording program for the information recording is recorded so as to be readable through a computer including a personal computer.

The above object of the present invention can be achieved by an information recording apparatus provided with: a detecting device such as an navigation pack detecting unit etc., for detecting whether a recording signal to be inputted from the outside is a specific recording signal having characteristics as a recording signal recorded in an available recording medium; and an inhibiting device such as a CPU etc., for, when it is detected that the recording signal is the specific recording signal, inhibiting the recording signal from being recorded in another recording medium.

Accordingly, when the inputted recording signal has characteristics as a recording signal recorded in the available recording medium, the recording signal is inhibited from being recorded in the recording medium. Consequently, a recording signal recorded in an available recording medium that is not intended for home use can be prevented from being illegally copied with a simple and low-cost configuration.

Therefore, even in the information recording apparatus which cannot previously determine that a recording signal with any attribute is inputted, the recording signal recorded in the available recording medium can be prevented from being illegally copied with the simple and low-cost configuration.

In one aspect of the apparatus of the present invention, the detecting device is provided with: a first detecting device such as an navigation pack detecting unit etc., for detecting whether the recording signal to be inputted from the outside is a recording signal conformable to DVD video standards only for playback; and a second detecting device such as a flag detecting unit etc., for detecting whether the recording signal is a recording signal formed by telecine conversion, and when it is detected that the recording signal conforms to the DVD video standards and it is detected that the recording signal is the recording signal formed by the telecine conversion, the inhibiting device inhibits the recording signal from being recorded in the recording medium.

Accordingly, when the recording signal conforms to the DVD video standards and the recording signal is formed by telecine conversion, the recording signal is inhibited from being recorded in the recording medium. Consequently, a recording signal conformable to the DVD video standards can be prevented from being illegally copied with a simple and low-cost configuration.

In another aspect of the apparatus of the present invention, when the recording signal includes a navigation pack conformable to the DVD video standards, the first detecting device detects that the recording signal conforms to the DVD video standards.

Accordingly, whether the recording signal conforms to the DVD video standards is determined on the basis of whether the navigation pack conformable to the DVD video standards is detected. Consequently, the attribute of the recording signal can be simply and securely detected.

In further aspect of the apparatus of the present invention, when it is detected that the recording signal includes a conversion flag such as a TFF etc., indicating that the recording signal is the recording signal formed by the telecine conversion, the second detecting device detects that the recording signal is the recording signal formed by the telecine conversion.

Accordingly, whether the recording signal is formed by the telecine conversion is determined on the basis of whether the conversion flag indicating that the recording signal is a recording signal formed by the telecine conversion is detected. Consequently, the attribute of the recording signal can be simply and securely detected.

The above object of the present invention can be achieved by an information recording method provided with: a detecting process of detecting whether a recording signal to be inputted from the outside is a specific recording signal having characteristics as a recording signal recorded in an available recording medium; and an inhibiting process of, when it is detected that the recording signal is the specific recording signal, inhibiting the recording signal from being recorded in another recording medium.

Accordingly, when the inputted recording signal has characteristics as a recording signal recorded in the available recording medium, the recording signal is inhibited from being recorded in the recording medium. Consequently, a recording signal recorded in an available recording medium that is not intended for home use can be prevented from being illegally copied with a simple and low-cost configuration.

Therefore, even in the information recording apparatus which cannot previously determine that a recording signal with any attribute is inputted, the recording signal recorded in the available recording medium can be prevented from being illegally copied with the simple and low-cost configuration.

In one aspect of the method of the present invention, the detecting process is provided with: a first detecting process of detecting whether the recording signal to be inputted from the outside is a recording signal conformable to DVD video standards only for playback; and a second detecting process of detecting whether the recording signal is a recording signal formed by telecine conversion, and in the inhibiting process, when it is detected that the recording signal conforms to the DVD video standards and it is detected that the recording signal is the recording signal formed by the telecine conversion, the recording signal is inhibited from being recorded in the recording medium.

Accordingly, when the recording signal conforms to the DVD video standards and the recording signal is formed by the telecine conversion, the recording signal is inhibited from being recorded in the recording medium. Consequently, the recording signal conformable to the DVD video standards can be prevented from being illegally copied with the simple and low-cost configuration.

In another aspect of the method of the present invention, when the recording signal includes a navigation pack conformable to the DVD video standards, it is detected in the first detecting process that the recording signal conforms to the DVD video standards.

Accordingly, whether the recording signal conforms to the DVD video standards is determined on the basis of whether the navigation pack conformable to the DVD video standards is detected. Consequently, the attribute of the recording signal can be simply and securely detected.

In further aspect of the method of the present invention, in the second detecting process, when it is detected that the recording signal includes a conversion flag indicating that the recording signal is the recording signal formed by the telecine conversion, it is detected that the recording signal is the recording signal formed by the telecine conversion.

Accordingly, whether the recording signal is formed by the telecine conversion is determined on the basis of whether the conversion flag indicating that the recording signal is a recording signal formed by the telecine conversion is detected. Consequently, the attribute of the recording signal can be simply and securely detected with a simple and low-cost configuration.

The above object of the present invention can be achieved by an information recording medium in which a recording control program is recorded so as to be readable through a computer which is included in an information recording apparatus for recording a recording signal to be inputted from the outside in another recording medium, the recording control program being characterized by allowing the computer to function as: a detecting device for detecting whether the recording signal is a specific recording signal having characteristics as a recording signal recorded in an available recording medium; and an inhibiting device for, when it is detected that the recording signal is the specific recording signal, inhibiting the recording signal from being recorded in the recording medium.

Accordingly, when the inputted recording signal has characteristics as a recording signal recorded in the available recording medium, the computer functions so as to inhibit the recording signal from being recorded in the recording medium. Consequently, the recording signal recorded in the available recording medium that is not intended for home use can be prevented from being illegally copied with a simple and low-cost configuration.

Therefore, even in the information recording apparatus which cannot previously determine that a recording signal with any attribute is inputted, the recording signal recorded in the available recording medium can be prevented from being illegally copied with the simple and low-cost configuration.

In one aspect of the medium of the present invention, the recording control program allows the computer functioning as the detecting device to function as: a first detecting device for detecting whether the recording signal to be inputted from the outside is a recording signal conformable to DVD video standards only for playback; and a second detecting device for detecting whether the recording signal is a recording signal formed by telecine conversion, and when it is detected that the recording signal conforms to the DVD video standards and it is detected that the recording signal is the recording signal formed by the telecine conversion, the program allows the computer functioning as the inhibiting device to function so as to inhibit the recording signal from being recorded in the recording medium.

Accordingly, when the recording signal conforms to the DVD video standards and the recording signal is formed by the telecine conversion, the computer functions so as to inhibit the recording signal from being recorded in the recording medium. Consequently, the recording signal conformable to the DVD video standards can be prevented from being illegally copied with a simple and low-cost configuration.

In another aspect of the medium of the present invention, when the recording signal includes a navigation pack conformable to the DVD video standards, the recording control program allows the computer functioning as the first detecting device to function so as to detect that the recording signal conforms to the DVD video standards.

Accordingly, whether the recording signal conforms to the DVD video standards is determined on the basis of whether the navigation pack conformable to the DVD video standards is detected. Consequently, the attribute of the recording signal can be simply and securely detected.

In further aspect of the medium of the present invention, when it is detected that the recording signal includes a conversion flag indicating that the recording signal is the recording signal formed by the telecine conversion, the recording control program allows the computer functioning as the second detecting device to function so as to detect that the recording signal is the recording signal formed by the telecine conversion.

Accordingly, whether the recording signal is formed by the telecine conversion is determined on the basis of whether the conversion flag indicating that the recording signal is a recording signal formed by the telecine conversion is detected. Consequently, the attribute of the recording signal can be simply and securely detected.

DETAILED DESCRIPTION OF THE PREFERRED EMBODIMENTS

A preferred embodiment of the present invention will be now described with reference to the drawings.

The present embodiment described herein below relates to an information recording apparatus to which the present invention is applied. The apparatus can receive recording information of movies based on the DVD video standards (a compression system thereof is MPEG-2 system) as recording format standards for information of movies in a DVD only for playback from the outside. The apparatus functions as a data recorder built in a personal computer.

(I) Embodiment of DVD Video Standards

Before the description of the specific embodiment of the information recording apparatus, the outline of the DVD video standards to which recording information of movies conforms will now be described with reference to FIGS. 1 to 4. The recording information of movies may be inputted to the information recording apparatus according to the embodiment.

Figure 1:
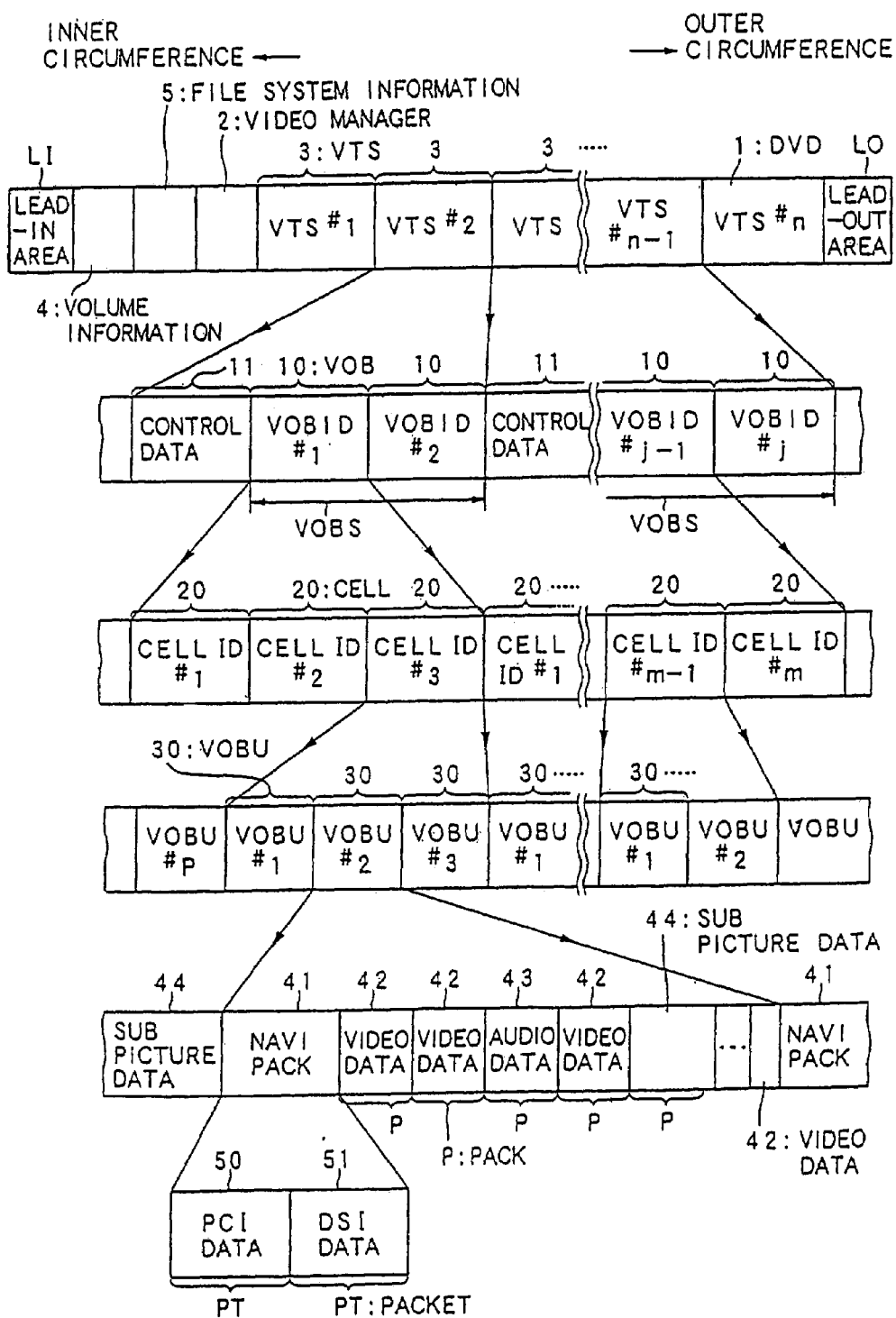
FIG. 1 is a diagram (I) showing a physical recording format in DVD video standards.
Figure 2:
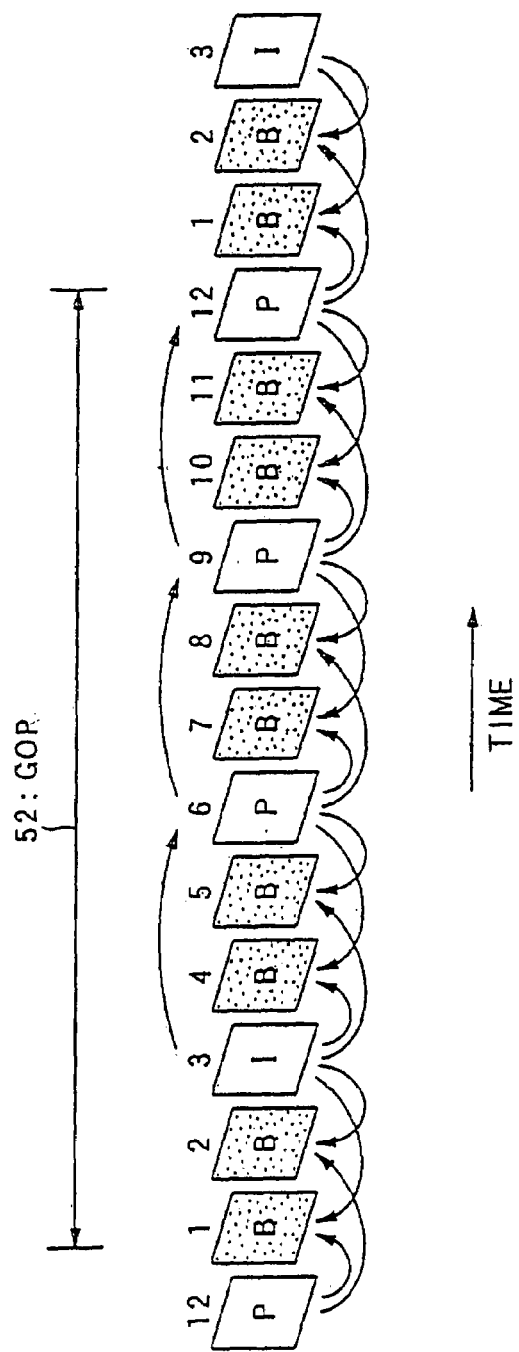
FIG. 2 is a diagram showing the configuration of a GOP in the DVD video standards.
Figure 3:
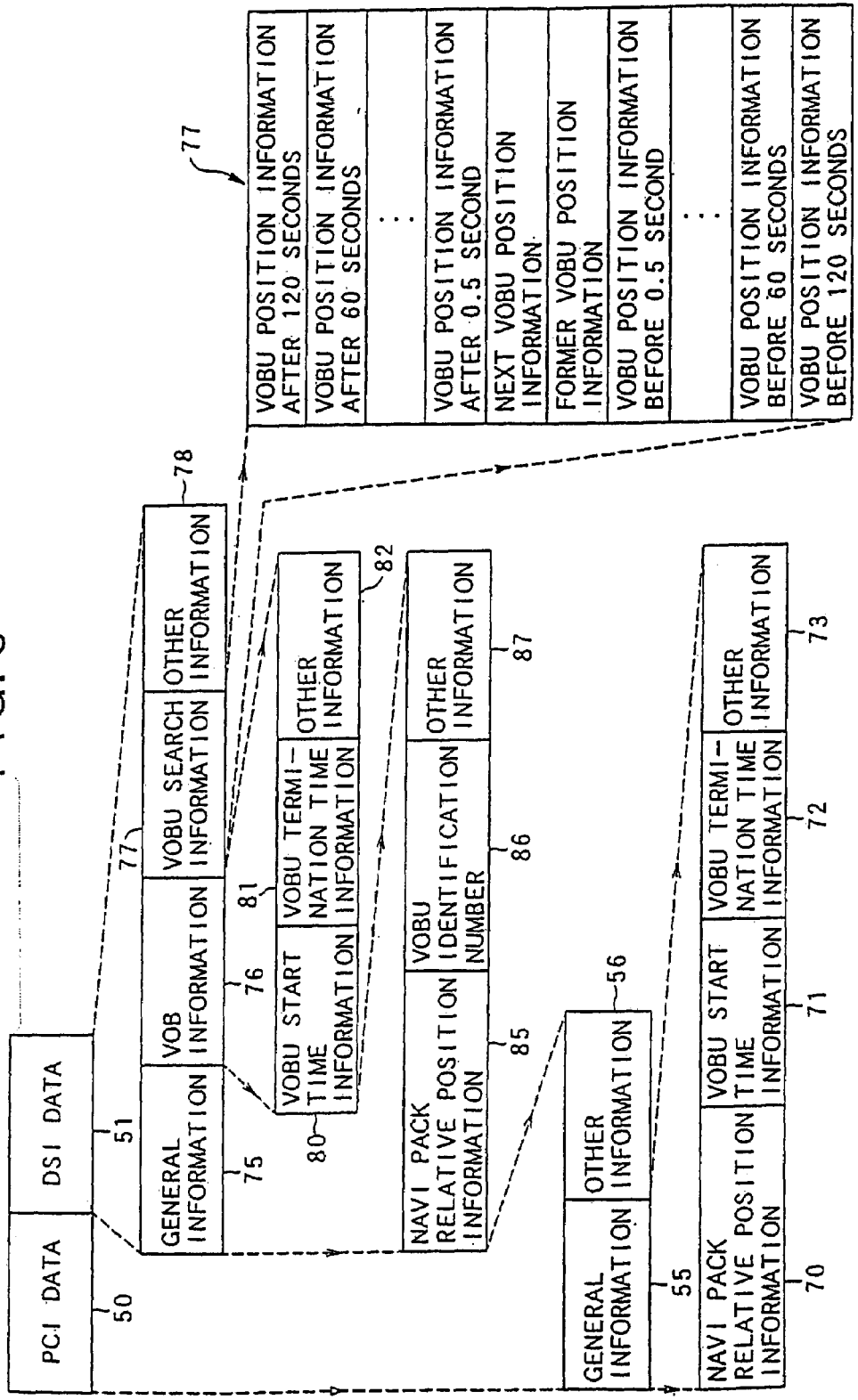
FIG. 3 is a diagram (II) showing another physical recording format in the DVD video standards.
Figure 4:
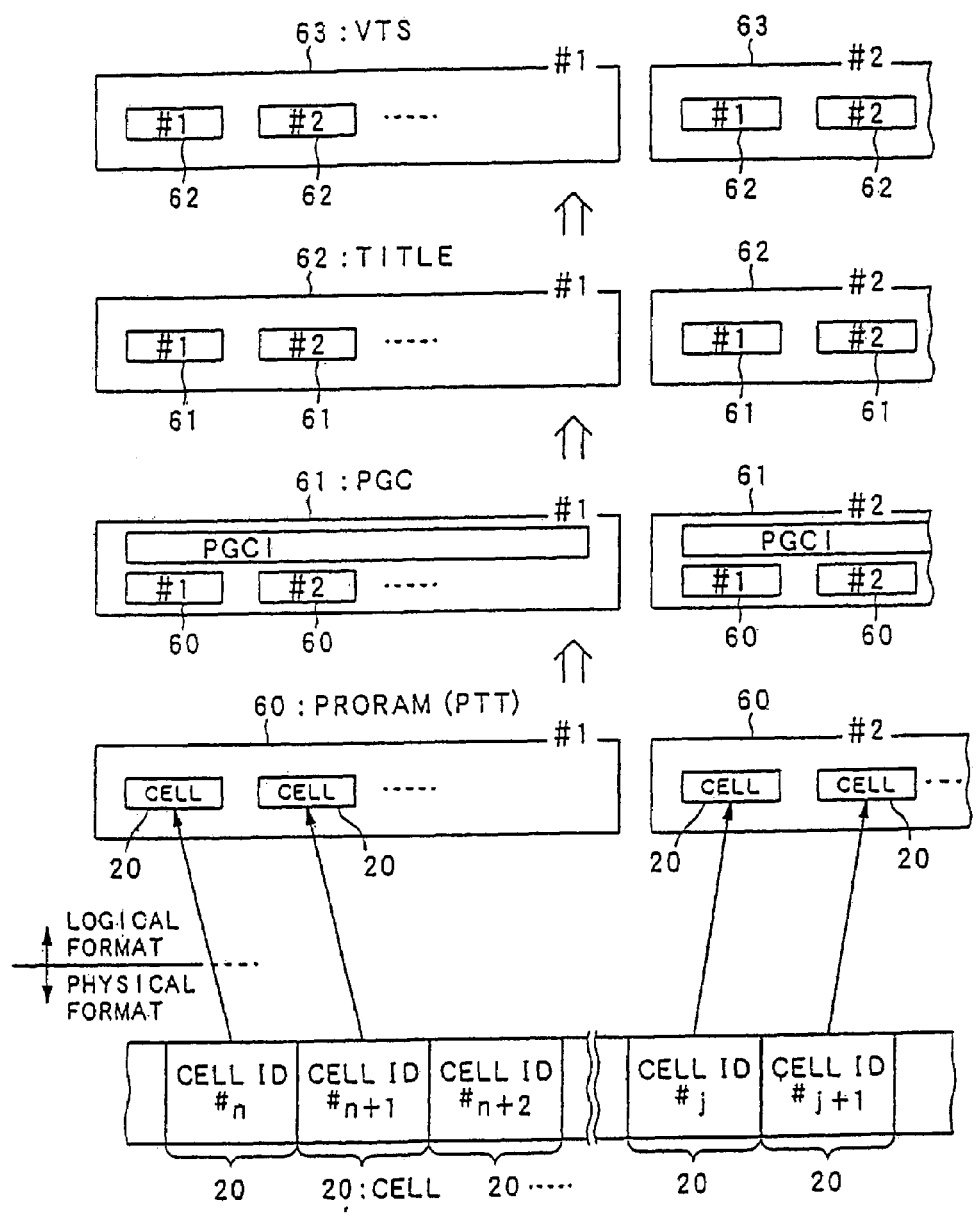
FIG. 4 is a diagram showing a logical format in the DVD video standards.

FIG. 1 and FIG. 3 are diagrams each showing a physical recording format in the DVD video standards. FIG. 2 is a diagram showing the configuration of a GOP (Group Of Picture) in the DVD video standards. FIG. 4 is a diagram showing a logical format in the DVD video standards.

In the following description, the physical format in a state where recording information conformable to the DVD standards has been recorded in the DVD only for playback will be explained. When the recording information is inputted to the information recording apparatus according to the embodiment, the information is inputted while maintaining the following physical format.

As shown in FIG. 1, a DVD 1 in which recording information has been recorded in conformity with the DVD video standards has a lead-in area LI in the innermost portion thereof and a lead-out area LO in the outermost portion thereof. Between the areas, picture information and speech information are recorded so as to be divided into a plurality of VTSs (Video Title Set) 3 (VTS #1 to VTS #n) each having an ID (identification) number.

In this instance, the VTS denotes a set (group) obtained by collecting titles (such as movies each of which is a piece of work that a producer presents to an audience) related to each other (the respective titles have the same attributes such as the number of included speech information and sub-picture information such as subtitles in movies, specification, and corresponding language). More specifically, for example, a plurality of movies having words of different languages regarding the same movie are recorded as different titles in some cases. Alternatively, a theatrical film and a special film of the same movie are recorded as different titles in some cases.

Just before the area where the VTS 3 is recorded, a video manager 2 is recorded. VMGI (Video Manager Information) as information which is recorded as the video manager 2 includes, for example, a menu showing titles, information for preventing illegal copy, an access table to access the titles, backup information for the above information, and information related to the whole of picture information and speech information recorded in the DVD 1.

Furthermore, between the video manager 2 and the lead-in area LI, volume information 4 for identifying the whole information recorded in the DVD 1 and file system information 5 indicative of the file configuration of data in the video manager 2 and the respective VTSs 3 are recorded.

Subsequently, each VTS 3 comprises control data 11 at the head and the part corresponding to the VTS excluding the control data is recorded so as to be divided into a plurality of VOBs 10 each having the ID number. In this instance, the part comprising the plurality of VOBs 10 is referred to a VOB set (VOBS). To distinguish the control data 11 as other data constructing the VTS 3 from the part comprising the plurality of VOBs 10 serving as a substance of picture information and speech information, the substance portion is set to the VOB set.

In the control data 11 recorded at the head of the VTS 3, information such as PGCI (Program Chain Information) as various information related to a program chain serving as a logic segment obtained by combining a plurality of cells (the cells will be described below), and backup information thereof are recorded as VTSI (Video Title Set Information). In each VOB 10, in addition to control information, the substance portions of the picture information and speech information (picture and speech other than control information) are recorded.

Furthermore, each VOB 10 comprises a plurality of cells 20 each having the ID number. In this instance, the VOB 10 is constructed so as to consist of the plurality of cells 20. Each cell 20 does not extend over two VOBs 10.

Subsequently, each cell 20 comprises a plurality of VOB units (VOBU) 30 each having the ID number. The VOB unit 30 denotes unit information including picture information, speech information, and sub-picture information.

Each VOB unit 30 comprises a navigation pack 41 in which control information for controlling data included in the VOB unit 30 is stored, video data 42 as picture information, audio data 43 as speech information, and sub-picture data 44 as sub-picture information. Picture data alone is recorded as the video data 42. Speech data alone is recorded as the audio data 43. As the sub-picture data 44, only graphic data such as a character or graphic serving as a sub-picture is recorded. Eight kinds of speech recordable in the DVD 1 and 32 kinds of recordable sub-pictures are determined on the basis of the standards.

Data is recorded so that reproduction time corresponding to each VOB unit 30 (reproduction time corresponding to data recorded between the present navigation pack 41 and the neighboring navigation pack 41) may be equal to or longer than 0.4 second and be equal to or less than 1 second. Accordingly, the navigation pack 41 is necessarily detected once per 0.4 to 1 second upon reproduction.

Furthermore, the navigation pack 41 necessarily exists at the head of the VOB unit 30. The video data 42, audio data 43, and sub-picture data 44 do not necessarily exist in the VOB unit 30. Even when they exist, the number and order thereof can be arbitrarily set.

Ordinarily, each of the segments serving as the video data 42, audio data 43, and sub-picture data 44 shown in FIG. 1 are referred to a pack P.

That is, the VOB unit 30 is recorded so as to be divided into the video data 42, audio data 43, and sub-picture data 44 as packs P. The pack P in which the video data 42 is recorded is referred to a video pack, pack P in which the audio data 43 is recorded is referred to an audio pack, and pack P in which the sub-picture data 44 is recorded is referred to a sub-picture pack.

Moreover, in a pack header recorded before the packs P, information such as read-out start time information, a start code indicative of the head of the packs P, and a transfer rate as data are recorded. The read-out start time information is called an SCR (System Clock Reference) indicative of read-out start time on the axis of reproduction time. At the read-out start time, data included in the packs P should be read out from a track buffer in an information reproducing apparatus for reproducing information recorded in the DVD 1 and should be inputted to buffers. As for the packs P, generally, the video data 42, audio data 43, or sub-picture data 44 is recorded every packet as a recording unit obtained by further dividing the pack P. In the DVD 1 in the present embodiment, generally, each pack P comprises one packet.

Finally, the navigation pack 41 comprises: a pack header 53 serving as the above-mentioned pack header corresponding to the navigation pack 41; a system header 54 in which information indicative of attributes of DSI data 51 and PCI data 50 subsequent to the system header is recorded; the DSI data 51 as retrieval information for retrieving a picture or speech desired to be displayed or replayed, (specifically, an address on the DVD 1, in which the picture or speech desired to be displayed or replayed is recorded); and the PCI data 50 as information related to playback/display control when the picture or speech retrieved on the basis of the DSI data 51 is displayed or replayed. At that time, the DSI data 51 and PCI data 50 are recorded so as to construct a DSI packet and a PCI packet as packets PT.

Furthermore, each video data 42, which is included in the VOB unit 30, comprises one or a plurality of GOPs.

The DSI data 51 and PCI data 50 will be described in detail below.

The PCI data 50 includes highlight information to define the display or operation of a selection item to be selected by the audience when the item is selected. On the basis of the highlight information, for example, a change in screen display for the item selection, a display position to be changed in accordance with the selection, and a command (instruction indicating the operation to be executed in accordance with the selected item) for the selected item are set in an image (namely, a menu screen) showing items to be selected by the audience.

In this case, image information to display a frame and selection buttons needed to form and display the menu screen is recorded as sub-picture data 44 serving as the above-mentioned sub-picture information.

Moreover, the GOP is a minimum image unit, which can be replayed alone, determined in the standards of MPEG-2 system serving as an image compression system that is used when picture information is recorded in the DVD 1 in the present embodiment. At the head of each GOP, playback/display time information called a PTS (Presentation Time Stamp) indicative of reproduction time on the axis of reproduction time, when the video data 42 included in the GOP should be displayed, is recorded.

In this instance, the outline of MPEG-2 system will now be described. In many cases, in continuous frame images, generally, frame images before and after one frame image are similar to each other and also relate to each other. MPEG-2 system pays attention to the above fact. According to the feature of the system, on the basis of a plurality of frame images transferred every several frames, the other frame image existing between the plurality of frame images is formed by an interpolating operation based on a motion vector of an original image. In this case, when the other frame image is recorded, information regarding the finite difference and motion vector between the plurality of frames is merely recorded, so that the other frame image can be reproduced by referring to the information and predicting from the plurality of frame images. Consequently, images can be compressed and recorded.

Furthermore, the outline of the GOP will now be described with reference to FIG. 2. FIG. 2 illustrates a plurality of frame images constructing the GOP. FIG. 2 shows a case where the GOP 52 comprises 12 frame images (in MPEG-2 system, the number of frame images included in the GOP 52 is not fixed). Each frame image shown by a reference symbol "I" among them is called an I picture (Intra-coded picture). The I picture is the frame image which is independently reproducible as a complete frame image. A frame image shown by a reference symbol "P" is called a P picture (Predictive-coded picture). The P picture is a predicted image formed by decoding a difference from the predicted image compensated and reproduced on the basis of the decoded I picture or other P picture. A frame image shown by a reference symbol "B" is called a B picture (Bidirectionally predictive-coded picture). The B picture denotes a predicted image reproduced by using not only the decoded I picture or P picture but also an I picture or a P picture recorded in an optical disc, which is located in the future temporally. In FIG. 2, predictive relations (interpolating relations) between the pictures are shown by arrows.

In MPEG-2 system generally used in the DVD 1 according to the present embodiment, a variable rate system in which an amount of data included in each GOP 52 is not fixed is used. In other words, each picture included in the GOP 52 corresponds to a high-speed moving image. When the correlation between the pictures is small, the amount of data constructing each picture is large, so that the amount of data included in the GOP 52 is also large. When each picture included in the GOP 52 corresponds to a moving picture with a small motion and the correlation between the pictures is large, the amount of data comprising each picture is small, so that the amount of data included in the GOP 52 is also small.

In the GOP 52 conformable to the above-mentioned MPEG-2 system, the pictures are more stepwisely formed. Specifically, in the GOP 52, the pictures are layered so that a picture layer, a slice layer, a macro-block layer, and a block layer may be stepwisely formed in a depth direction. When recording information recorded in the DVD 1 is formed by the so-called telecine conversion (2:3 pull-down conversion) for converting a movie mode (comprising still pictures of about 24 frames per second) into a mode corresponding to a television signal (comprising still pictures of about 30 frames per second), a TFF (Top Field First) and an RFF (Repeat First Flag) are set in the picture layer. Specifically, the above-mentioned series of processes, TFF, and RFF are described in detail in "Illustrated Latest MPEG Textbook" edited by Multi-media Communication Research Association under the supervision by Hiroshi Fujiwara, published by ASCII Corporation, pages 154 to 165, 1994.

In this instance, when the recording information formed through the telecine conversion (namely, the recording information in which the TFF and RFF are set in the picture layer) is recorded in the DVD 1, the DVD 1 is available and the recording information is formed by a movie distribution source. Accordingly, the recording information should be protected from copyright infringement such as illegal copy.

In the above-mentioned recording format with the stepwise structure shown in FIG. 1, as to the segments, the producer freely sets the segments according to their intention to record data. Various reproductions can be realized by reproducing data by every segment on the basis of a logical structure, which will be described below.

Subsequently, the physical data structure of each of the DSI data 51 and PCI data 50 will now be described with reference to FIG. 3. The data structure (specifically, address information and the data length from the head of the navigation pack 41 where data is recorded) described herein below is specific to the navigation pack 41. This data structure is not observed in the other packs P.

Referring to FIG. 3, the PCI data 50 comprises: general information 55 as the main body of the PCI data 50; and other information 56.

Furthermore, the general information 55 comprises: navigation pack relative position information 70 as relative recording address information from the head of the VOB 10 of the navigation pack 41; VOBU reproduction start time information 71 indicative of reproduction start time on the reproduction time axis of the VOB unit 30 where the navigation pack 41 is included; VOBU reproduction end time information 72 indicative of reproduction end time on the reproduction time axis of the VOB unit 30; and other information 73.

The DSI data 51 comprises: general information 75 as the main body of the DSI data 51; VOB information 76 as information regarding the VOB 10 to which the navigation pack 41 belongs; VOBU search information 77 indicative of a recording position of the VOB unit 30 on the DVD 1, which should be reproduced before and after the VOB unit 30 to which the navigation pack 41 belongs; and other information 78.

The general information 75 comprises: navigation pack relative position information 85 similar to the navigation pack relative position information 70; a VOBU identification number 86 to identify the VOB unit 30 to which the navigation pack 41 belongs; and other information 87.

Furthermore, the VOB information 76 comprises: VOB reproduction start time information 80 indicative of reproduction start time on the reproduction time axis of the VOB 10 to which the VOB unit 30 including the navigation pack 41 belongs; VOB reproduction end time information 81 indicative of reproduction end time on the reproduction time axis of the VOB 10; and other information 82.

Furthermore, the VOBU search information 77 includes in a list as shown in FIG. 3: position information indicative of recording positions on the DVD 1 of the preceding and next VOB units 30 of the present VOB unit 30 to which the navigation pack 41 belongs; and position information indicative of recording positions on the DVD 1 of the other VOB units 30 to be reproduced within 120 seconds before and after the start time of the present VOB unit 30.

A logical format (logical structure) obtained by combining information recorded in the physical segments shown in FIG. 1 or 3 will now be described with reference to FIG. 4. As for the logical structure shown in FIG. 4, information is not actually recorded in the DVD 1 in the structure. Information (access information or time information) to combine and reproduce data (particularly, the cells 20) shown in FIG. 1 in the logical structure shown in FIG. 4 is recorded in the DVD 1, particularly, in the control data 11.

To clarify the description, the structure will now be described in order from the lower process in FIG. 4. A plurality of cells 20 in the physical structure described in FIG. 1 are selected and combined to logically form a program 60 on the basis of the producer's intention. The program 60 serves as a minimum logical unit which a system controller in the information reproducing apparatus can identify the segment and access it by a command. The producer can also define the program 60 as a minimum unit which the audience can freely select one or a plurality of programs as a set and then view and listen. The unit is called a PTT (Part of Title).

Since the program 60 is logically constructed by selecting the plurality of cells 20, a plurality of programs 60 use one cell 20. In other words, the producer can also reproduce the cell 20 in the different programs 60, namely, reuse the cell 20.

As for the number of the cell 20, when the cell 20 is used in the physical format shown in FIG. 1, the number is used as the cell ID number (in FIG. 1, shown as cell ID#). When the cell is used in the logical format shown in FIG. 4, the number is used as the cell number in description order in a PGCI, which will be explained below.

Subsequently, a plurality of programs 60 are combined to logically construct a PGC (Program Chain) 61 on the basis of the producer's intention. The above-mentioned PGCI is defined on the unit basis of the PGC 61. The PGCI includes:

reproduction order of the cells 20 in each program 60 upon reproduction of the programs 60 (a specific program number is allocated to each program 60 in accordance with the reproduction order); addresses serving as recording positions of the cells 20 in the DVD 1; the number of the head cell 20 to be reproduced in the program 60; a method for reproducing the program 60 [when information is recorded in the DVD 1 of the present embodiment, the producer can select upon reproduction any one of reproducing methods such as normal reproduction, random reproduction (random reproduction using random numbers; in some cases, the same program 60 is reproduced plural times), and shuffle reproduction (random reproduction using random numbers similar to the random reproduction; the same program 60 is reproduced only once and the same program 60 is not reproduced plural times) for each PGC 61 to reproduce the program 60]; and various commands (the producer can designate for each PGC 61 or cell 20).

As mentioned above, the recording position of the PGCI in the DVD 1 is located in the control data 11 (refer to FIG. 1). When the PGCI is a PGCI related to the menu in the video manager 2, the recording position of the PGCI exists in the control data (omitted in the diagram) included in the video manager 2.

In addition to the PGCI, the PGC 61 includes data such as substantive pictures and speech as a combination of the programs 60 (in other words, as a combination of the cells 20).

Furthermore, in the PGC 61, the reuse of the cell 20 mentioned in the description regarding the program 60 can also be realized (namely, the same cell 20 is used in the different PGCs 61). As for the cell 20 to be used, in addition to a method for reproducing the cells 20 in storing order in the DVD 1 (reproduction of continuously arranged cells), the producer can select a method for reproducing the cells 20 irrespective of the storing order in the DVD 1 (for example, the cell 20 recorded later is previously reproduced) (reproduction of discontinuously arranged cells).

Subsequently, one or a plurality of PGCs 61 logically construct one title 62. For example, the title 62 is a unit corresponding to one movie and indicates complete information which the producer wants to present to the audience for the DVD 1.

One or a plurality of titles 62 logically construct one VTS 63. The titles 62 included in the VTS 63 have attributes common to the respective titles. For example, movies with different languages for the same movie correspond to the titles 62. Information corresponding to one VTS 63 shown in FIG. 4 corresponds to information included in the VTS 3 shown in FIG. 1. That is, in the DVD 1, all information logically included in the VTS 63 shown in FIG. 4 is recorded as one VTS 3.

On the basis of the above-mentioned logical format, the producer designates information separated in the physical structure to form the title (movie) which the audience will view.

(II) Embodiment of Information Recording Apparatus

Subsequently, the configuration and operation of the information recording apparatus according to the present embodiment, to which a recording signal corresponding to recording information based on the above-mentioned DVD video standards may be inputted, will now be described with reference to FIGS. 5 and 6.

Figure 5:
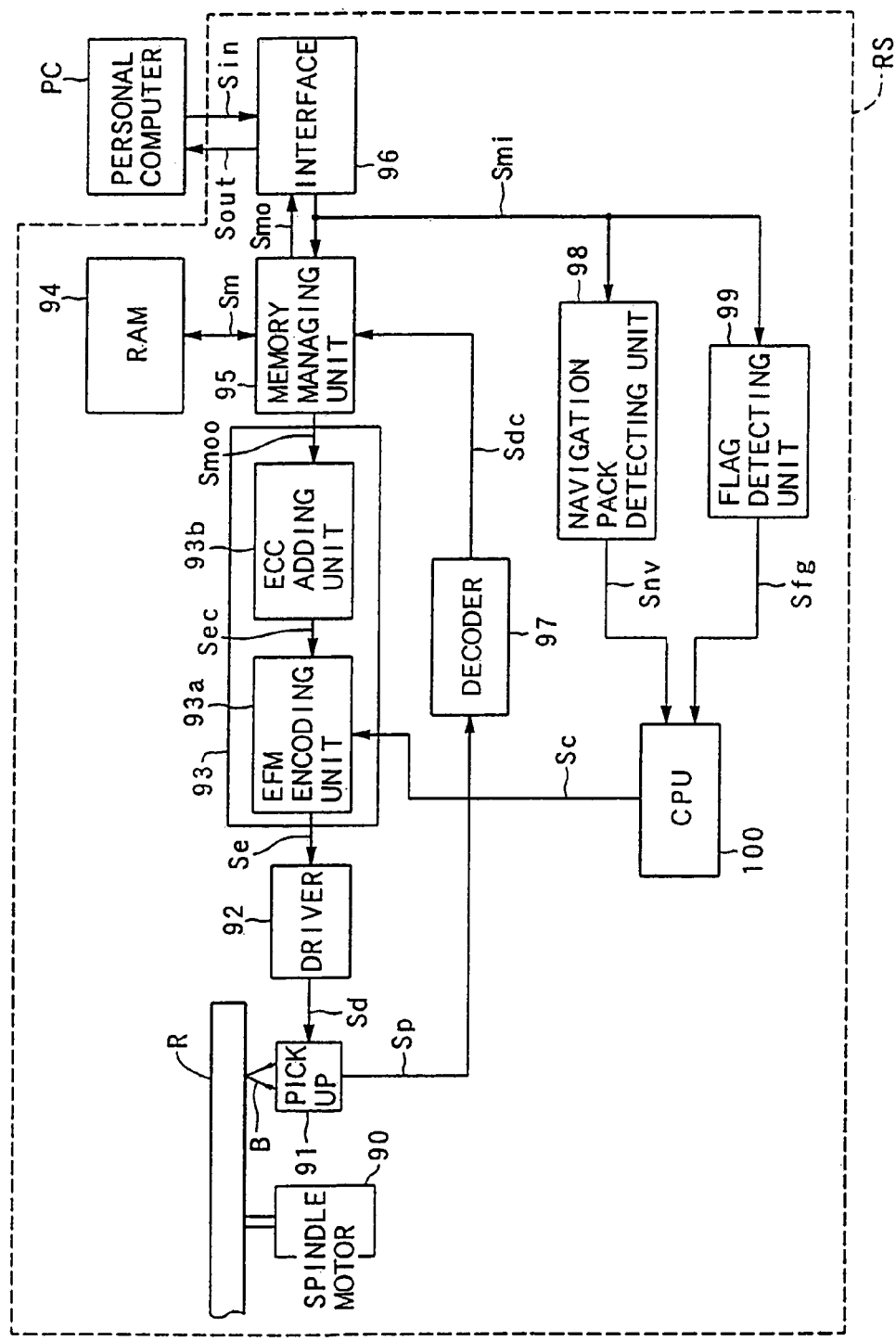
FIG. 5 is a block diagram showing the schematic configuration of an information recording apparatus according to an embodiment.

FIG. 5 is a block diagram showing the schematic configuration of the information recording apparatus. FIG. 6 is a flowchart showing a recording processing according to the embodiment.

Referring to FIG. 5, an information recording apparatus RS according to the present embodiment is a data recorder which is connected to or built in a personal computer PC and which can record recording information in an optical disc R as a recording medium such as a recordable DVD and can reproduce the recording information from the optical disc R. Specifically, the apparatus comprises: a spindle motor 90; a pickup 91; a driver 92; an encoder 93; an RAM (Random Access Memory) 94; a memory managing unit 95; an interface 96; a decoder 97; a navigation pack detecting unit 98 as detecting device and first detecting device; a flag detecting unit 99 as detecting device and second detecting device; and a CPU 100 as inhibiting device.

The encoder 93 comprises: an EFM (Eight to Fourteen Modulation) encoding unit 93$a$; and an ECC (Error Correcting Code) adding unit 93$b$.

The operation will now be described.

First, the operation in a case where information which has already been recorded in the optical disc R is reproduced will now be described.

When information is reproduced, first, the spindle motor 90 is rotated by a spindle servo mechanism (not shown) which operates through the control of the CPU 100 and also rotates the optical disc R mounted on and fixed to the rotation axis of the motor at a predetermined rotational speed.

On the other hand, the pickup 91 irradiates a light beam B for reproduction with a predetermined fixed intensity to the rotating optical disc R, receives reflected light to form a detection signal $S_p$ corresponding to the recorded information, and outputs the signal to the decoder 97.

Consequently, the decoder 97 performs a predetermined decoding processing to the detection signal $S_p$ to form a reproduction signal $S_{dc}$ corresponding to the recorded information and then outputs the signal to the memory managing unit 95.

The memory managing unit 95 temporarily holds the reproduction signal $S_{dc}$ as a memory signal $S_m$ in the RAM 94 and also outputs the signal as a memory output signal $S_{mo}$ to the interface 96 at predetermined timing.

After that, the interface 96 performs a predetermined output interface processing to the memory output signal $S_{mo}$ and then generates the signal as an output signal $S_{out}$ to the personal computer PC.

Accordingly, the personal computer PC performs a necessary information processing with information included in the output signal $S_{out}$, which is recorded in the optical disc R.

Subsequently, the operation in a case where recording information to be inputted as an input signal $S_{in}$ from the personal computer PC is recorded in the optical disc R will now be described.

When the information is recorded, the spindle motor 90 rotates the optical disc R mounted on and fixed to the rotation axis of the motor at the predetermined rotational speed in the same way as the reproduction of information.

On the other hand, the interface 96 performs a predetermined input interface processing to the input signal $S_{in}$ outputted from the personal computer PC and then outputs the signal as a processed input signal $S_{mi}$ to the memory managing unit 95, navigation pack detecting unit 98, and flag detecting unit 99.

In this instance, when the recording information to be inputted as an input signal $S_{in}$ is conformable to the above-mentioned DVD video standards (namely, the recording information is protected by copyright and illegally copying the information is prohibited), the navigation packs 41 are included in the processed input signal $S_{mi}$ at the above-mentioned regular intervals and the TFF and RFF are included in the picture layer in the GOP 52.

Subsequently, the memory managing unit 95 allows the RAM 94 to temporarily store the processed input signal $S_{mi}$ as the memory signal $S_m$, reads out the signal, and then outputs the signal as a memory output signal $S_{moo}$ to the ECC adding unit 93b in the encoder 93.

The ECC adding unit 93b adds an error correction code, which is used for error correction when the recording information is reproduced after recording in the optical disc R, to the memory output signal $S_{moo}$ forms a code-added signal $S_{ec}$ and then outputs the signal to the EFM encoding unit 93a in the same encoder 93.

Consequently, the EFM encoding unit 93a performs a predetermined encoding processing (specifically, for example, an EFM encoding processing) to the code-added signal $S_{ec}$, forms an encoded signal $S_e$ and then outputs the signal to the driver 92. In this instance, when a recording inhibition signal $S_c$, which will be described below, is generated from the CPU 100, the EFM encoding unit 93a stops the generating of the encoded signal $S_e$ and interrupts the subsequent recording processing.

The driver 92 performs an amplifying processing and a waveform shaping processing to the encoded signal $S_e$, forms a driving signal $S_d$ to drive a semiconductor laser (not shown) in the pickup 91 and then outputs the signal to the semiconductor laser.

Consequently, the semiconductor laser (not shown) generates the light beam B for recording, whose intensity is controlled on the basis of the driving signal $S_d$, and irradiates the beam to a track (not shown) (the track in which the recording information supplied from the personal computer PC should be recorded) on the optical disc R, thereby records the recording information in the optical disc R.

Simultaneously with the above processing, the navigation pack detecting unit 98 detects whether the processed input signal $S_{mi}$ includes the navigation pack 41 (namely, whether the recording information from the personal computer PC is conformable to the DVD video standards), generates a detection signal $S_{nv}$ indicative of the detection result, and then outputs the signal to the CPU 100.

In this instance, the method for detecting the navigation pack 41 is as follows. Specifically, since the navigation pack 41 is constructed so as to have the specific data structure as mentioned above, whether the data structure peculiar to the navigation pack 41 exists in the inputted processed input signal $S_{mi}$ (namely, whether the combination of the address information in the detected pack P and the data length of data recorded therein is similar to the combination peculiar to the navigation pack 41) is determined to detect the presence or absence of the navigation pack 41 in the processed input signal $S_{mi}$.

On the other hand, the flag detecting unit 99 detects the presence or absence of the TFF and RFF in the case where the processed input signal $S_{mi}$ includes the navigation pack 41, generates a detection signal $S_{fg}$ indicating the detection result, and then outputs the signal to the CPU 100.

Consequently, on receiving the detection signal $S_{nv}$ indicating the detection of the navigation pack 41 in the processed input signal $S_{mi}$ and receiving the detection signal $S_{fg}$ indicating that the TFF and RFF exist, the CPU 100 generates the recording inhibition signal $S_c$ to stop the above series of recording processings and then outputs the signal to the EFM encoding unit 93a.

In addition to the above-mentioned recording inhibition control processing according to the present embodiment, the CPU 100 performs a processing for controlling the whole operation of the information recording apparatus RS, the processing including a focus servo control processing for servo-controlling the irradiating position of the light beam B and a tracking servo control processing.

Subsequently, the whole flow of the recording processing according to the present embodiment, which is mainly executed in the CPU 100, will now be described with reference to FIG. 6.

Figure 6:
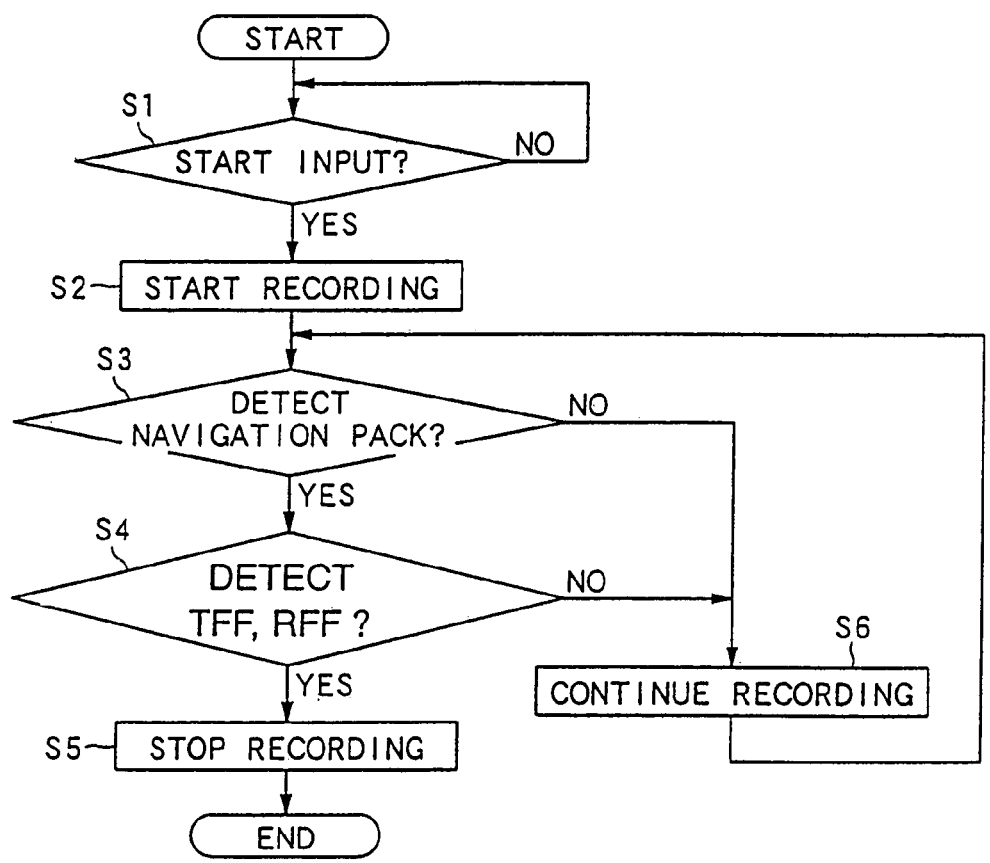
FIG. 6 is a flowchart showing a recording processing according to the embodiment.

As shown in FIG. 6, in the recording processing according to the present embodiment, whether the input of the input signal $S_{in}$ is started is first determined (step S1). When it is not started (NO in step S1), the CPU 100 waits as it is. On the other hand, when the input is started (YES in step S1), the encoder 93 is operated so as to start to record the recording information included in the input signal $S_{in}$ in the optical disc R (step S2).

Subsequently, the navigation pack detecting unit 98 determines whether the presence of the navigation pack 41 in the processed input signal $S_{mi}$ (step S3). When the presence is confirmed (YES in step S3), the flag detecting unit 99 determines whether the TFF and RFF are detected (step S4).

When the TFF and RFF are detected (YES in step S4), provided that the recording information in the supplied input signal $S_{in}$ is conformable to the DVD video standards and copying is inhibited, the foregoing recording inhibition signal $S_c$ is generated to inhibit the subsequent recording processing in the optical disc R (step S5) and the processing is then finished.

On the other hand, when the navigation pack 41 is not detected (NO in step S3) in the determination in step S3, alternatively, when the TFF and RFF are not detected in step S4 (NO in step S4), provided that copying the recording information in the supplied input signal $S_{in}$ is not inhibited, the recording is continued so that the apparatus can function as a normal data recorder (step S6). Furthermore, to continue monitoring the copying inhibition, the processing routine returns to step S3.

As described above, in the operation of the information recording apparatus RS according to the present embodiment, when inputted recording information is conformable to the DVD video standards and includes the TFF and RFF, recording the recording information into the optical disc R is inhibited. Consequently, the apparatus can prevent recording information conformable to the DVD video standards, which is recorded in the available DVD 1 that is not intended for home use, from being illegally copied with a simple and low-cost configuration.

Since whether the recording information conforms to the DVD video standards is determined on the basis of whether the navigation pack 41 conformable to the DVD video standards is detected, the attribute of the recording information can be simply and securely detected.

Furthermore, whether recording signal is formed by the telecine conversion is determined on the basis of whether the TFF and RFF indicating that the recording information is formed by the telecine conversion are detected. Consequently, the attribute of recording information can be simply and securely detected.

In the above-mentioned embodiment, the case where recording was stopped when the TFF and RFF were detected once has been described. In addition to the case, to hold the redundancy for error detection, when the TFF and RFF are successively detected predetermined time or more, it can be detected that the TFF and RFF are set.

As for detecting the navigation pack 41, detecting every a certain amount of data of the navigation pack 41 (such as every 32 kilo bytes) instead of every navigation pack 41 can give adequate accuracy.

Furthermore, a program corresponding to the flowchart shown in FIG. 6 is stored to an information recording medium such as a flexible disk or a hard disk (through communication network such as the internet, if necessary). The program is read out and is then executed in a general personal computer. Consequently, it is possible to allow the personal computer to function as the CPU 100.

The entire disclosure of Japanese Patent Application No. 2000-303626 filed on Oct. 3, 2000 including the specification, claims, drawings and summary is incorporated herein by reference in its entirety.

What is claimed is:

1. An information recording apparatus comprising:
   a detecting device for detecting whether a recording signal to be inputted from the outside is a specific recording signal having characteristics as a recording signal recorded in an available recording medium; and
   an inhibiting device for, when it is detected that the recording signal is the specific recording signal, inhibiting the recording signal from being recorded in another recording medium, wherein
   the detecting device comprises:
   a first detecting device for detecting whether the recording signal to be inputted from the outside is a recording signal conformable to DVD video standards only for playback; and
   a second detecting device for detecting whether the recording signal is a recording signal formed by telecine conversion, and
   when it is detected that the recording signal conforms to the DVD video standards and it is detected that the recording signal is the recording signal formed by the telecine conversion, the inhibiting device inhibits the recording signal from being recorded in the recording medium.

2. The apparatus according to claim 1, wherein
   when the recording signal includes a navigation pack conformable to the DVD video standards, the first detecting device detects that the recording signal conforms to the DVD video standards.

3. The apparatus according to claim 1, wherein
   when it is detected that the recording signal includes a conversion flag indicating that the recording signal is the recording signal formed by the telecine conversion, the second detecting device detects that the recording signal is the recording signal formed by the telecine conversion.

4. An information recording method comprising:
   a detecting process of detecting whether a recording signal to be inputted from the outside is a specific recording signal having characteristics as a recording signal recorded in an available recording medium; and
   an inhibiting process of, when it is detected that the recording signal is the specific recording signal, inhibiting the recording signal from being recorded in another recording medium, wherein
   the detecting process comprises:
   a first detecting process of detecting whether the recording signal to be inputted from the outside is a recording signal conformable to DVD video standards only for playback; and
   a second detecting process of detecting whether the recording signal is a recording signal formed by telecine conversion, and
   in the inhibiting process, when it is detected that the recording signal conforms to the DVD video standards and it is detected that the recording signal is the recording signal formed by the telecine conversion, the recording signal is inhibited from being recorded in the recording medium.

5. The method according to claim 4, wherein
   when the recording signal includes a navigation pack conformable to the DVD video standards, it is detected in the first detecting process that the recording signal conforms to the DVD video standards.

6. The method according to claim 4, wherein
   in the second detecting process, when it is detected that the recording signal includes a conversion flag indicating that the recording signal is the recording signal formed by the telecine conversion, it is detected that the recording signal is the recording signal formed by the telecine conversion.

7. An information recording medium in which a recording control program is recorded so as to be readable through a computer which is included in an information recording apparatus for recording a recording signal to be inputted from the outside in another recording medium, the recording control program being characterized by allowing the computer to function as:
   a detecting device for detecting whether the recording signal is a specific recording signal having characteristics as a recording signal recorded in an available recording medium; and
   an inhibiting device for, when it is detected that the recording signal is the specific recording signal, inhibiting the recording signal from being recorded in the recording medium, wherein
   the recording control program allows the computer functioning as the detectiun device to function as:
   a first detecting device for detecting whether the recording signal to be inputted from the outside is a recording signal conformable to DVD video standards only for playback; and
   a second detecting device for detecting whether the recording signal is a recording signal formed by telecine conversion, and
   when it is detected that the recording signal conforms to the DVD video standards and it is detected that the recording signal is the recording signal formed by the telecine conversion, the program allows the computer functioning as the inhibiting device to function so as to inhibit the recording signal from being recorded in the recording medium.

8. The medium according to claim 7, wherein
   when the recording signal includes a navigation pack conformable to the DVD video standards, the recording control program allows the computer functioning as the first detecting device to function so as to detect that the recording signal conforms to the DVD video standards.

9. The medium according to claim 7, wherein
   when it is detected that the recording signal includes a conversion flag indicating that the recording signal is the recording signal formed by the telecine conversion, the recording control program allows the computer functioning as the second detecting device to function so as to detect that the recording signal is the recording signal formed by the telecine conversion.

* * * * *